United States Patent Office 3,417,273
Patented Dec. 17, 1968

3,417,273
APPARATUS FOR ACCELERATING PLASMA BY A STATIC MAGNETIC FIELD AND A TRAVELING WAVE
Duane C. Gates, Walnut Creek, Calif., and John F. Detko, Bayside, N.Y., assignors, by mesne assignments, to Aerojet-General Corporation, El Monte, Calif., a corporation of Ohio
Filed Jan. 7, 1965, Ser. No. 424,050
3 Claims. (Cl. 313—63)

ABSTRACT OF THE DISCLOSURE

This disclosure concerns an apparatus for accelerating a plasma of electrically charged particles along an elongated acceleration path. The apparatus or plasma accelerator comprises an elongated tubular member defining an axially extending acceleration path therewithin. The tubular member has a plasma-providing source at one end thereof. A magnetic coil is arranged about the same end of the tubular member so as to be concentrically disposed to the plasma-providing source within the tubular member. The magnetic coil is energized to establish a static magnetic field in the region where the plasma-providing source is located so that magnetic flux from the static magnetic field is established within the plasma as it is provided. A travelling magnetic wave generator is mounted about the tubular member and comprises a plurality of magnetic field coils extending axially in surrounding relation to the tubular member. The magnetic field coils of the magnetic wave generator are sequentially energized in succession to produce a magnetic field travelling along the acceleration path defined by the tubular member and accelerating the plasma therealong. The magnetic flux from the static magnetic field which has been established in the plasma is first compressed, then severed from the magnetic coil generating the static magnetic field, and finally reversed so as to be trapped within the plasma during its acceleration—all by the action of the travelling magnetic field—thereby being effective to substantially eliminate slippage between the plasma and the travelling magnetic field. A field shaping magnetic coil may be arranged about the tubular member adjacent to the magnetic coil establishing the static magnetic field so as to control the shape and extend of the static magnetic field just before the plasma with the magnetic flux established therein is discharged from the plasma-providing source into the region of the tubular member surrounded by the travelling magnetic wave generator.

---

The present invention generally relates to the acceleration of a plasma of electrically charged particles along an elongated acceleration path, and more particularly to a novel apparatus for improving the acceleration of a high conductivity plasma which provides for the establishment of a magnetic field within the plasma opposed to the travelling magnetic field relied upon for accelerating the plasma.

A great number of devices have been designed for accelerating high conductivity plasmas with a travelling magnetic field. The plasma, being highly conductive, inhibits the diffusion of the travelling wave's magnetic field lines into its volume. The mechanism involved is one of induced sheath currents which produce opposing fields. The net effect is a kind of pile-up of magnetic lines outside the bulk of the plasma volume implying a magnetic pressure upon the plasma. This pressure both compresses the plasma radially (raising its internal pressure) and drives it ahead of the advancing wave.

The plasma penetrates the travelling magnetic field poorly in direction perpendicular to the field lines. Particles of the plasma are not however prevented from moving freely along the magnetic field lines. Since it is the radial component of the travelling magnetic wave which in fact keeps the plasma in front of the wave, significant losses occur in the central region of the wave front where this radial component has a relatively small value. These losses occur where the magnetic field lines converge, somewhat as if through a hole in the travelling wave front. They will occur even if the magnetic field shapes are left essentially undisturbed by the presence of the plasma. However, it is possible for the plasma to aggravate the escape region losses by forcing the field lines apart in this region. The wave then rides up over the surface of the plasma while a large part of the plasma slips through the widened loss area moving generally parallel to the field lines as it does. This behavior is more pronounced with higher plasma conductivity, depending directly upon the plasma's capacity to exclude magnetic field lines. In this loss mechanism, the plasma may be thought of as behaving approximately like a fluid in a magnetic funnel whose walls exert a pressure on its contents and whose own thermal pressure keeps the walls out. Under this pressure, the plasma (fluid) moves out both ends of the funnel. The losses out of the narrow end of the accelerator can prove disastrous for travelling wave systems which do not include some means to check this leakage known as plasma slippage.

It is therefore an object of the present invention to provide a novel apparatus for improving the acceleration of a high conductivity plasma by establishing a static magnetic field in the plasma and subsequently accelerating the plasma by a travelling magnetic wave.

Another object of the present invention is to provide a novel apparatus for accelerating plasma by a travelling magnetic wave wherein slippage between the plasma and the travelling magnetic wave is substantially prevented by establishing a magnetic field within the plasma which is independent of the travelling magnetic wave.

In its principal aspect, the present invention comprises the trapping of a distinct, opposed magnetic field within the plasma to be accelerated by the travelling magnetic wave. This interposes a magnetic field between the plasma and the slippage region and also tends to increase the cohesion of the palsma. In addition, this field provides an extra magnetic insulation from the walls of the accelerator and relieves the problem of disengagement of the plasma from the accelerator magnetic field at the accelerator exit.

By providing magnetic coils around the plasma source, the plasma will be estabilshed in a static magnetic field. A separate coil can be utilized to shape and/or extend this static field. The travelling magnetic wave of the accelerator can be made to act upon the static field in such a manner so as to effectively trap the static field within the plasma during acceleration. This static flux trapped in the plasma is no longer linked to the static field coils from which it emanated nor is it linked to the coils generating the travelling magnetic wave.

These and other objects, advantages, and features of this invention will be apparent to those skilled in the art from the following description taken together with the appended drawings wherein.

Figure 1:
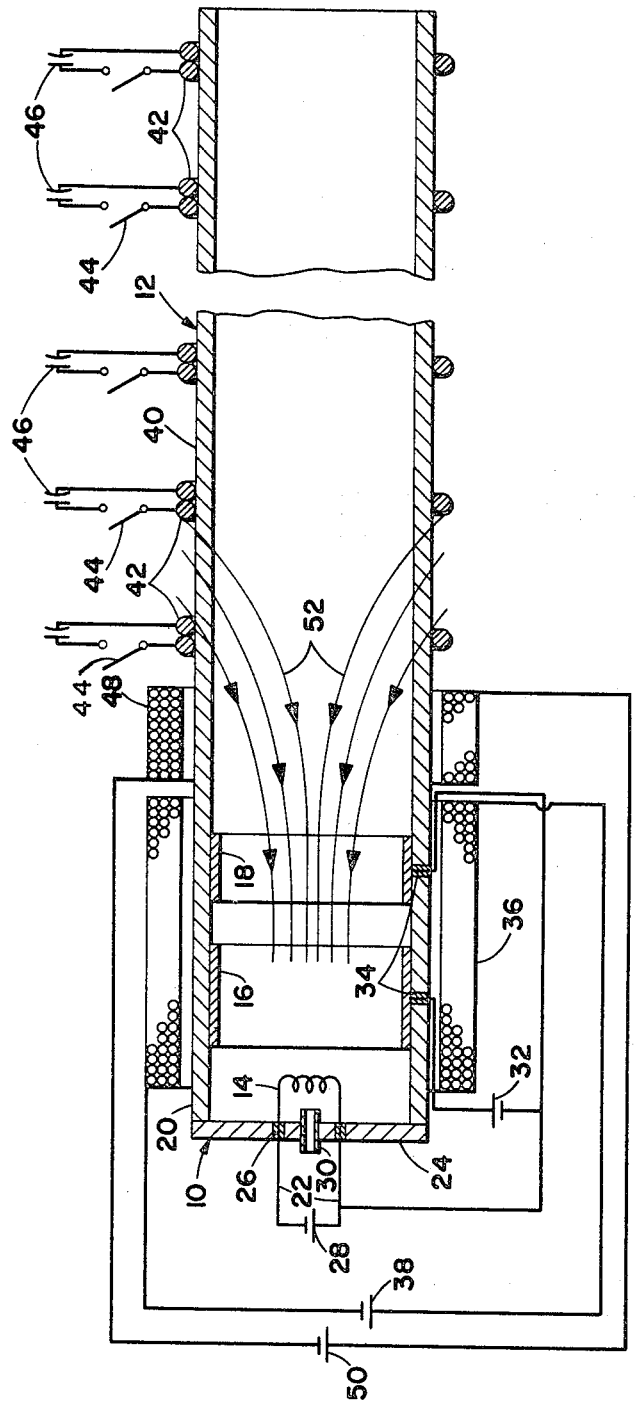
FIG. 1 is a longitudinal sectional view of a plasma accelerator constructed in accordance with the present invention.

Referring now to FIG. 1, there is shown a plasma source 10 and travelling magnetic wave plasma accelerator 12 as constructed in accordance with the present invention for accelerating a high conductivity plasma. The illustrative plasma source 10 comprises three electrodes 14, 16, and 18, arranged within a tube 20 of high temperature strength, non-conductive material such as Vycor glass, Pyrex, or ceramic. The first electrode 14, a fine wire of highly emissive material such as tungsten, carbon, or tantalum is centrally positioned at one end of the tube 20 and serves as a cathode. Electrical lead wires 22 to the cathode 14 extend through an end plate 24 at the cathode end of the tube 20. The end plate 24, of the same material as the tube, is provided with insulating collars 26 for the passage of the wires 22 which connect the cathode 14 in electrical series with a DC power source 28 such as a battery. A small gas tube 30 also extends through the central area of the end plate 24 to permit the entry of either hydrogen, mercury vapor, or one of the noble gases into the plasma source tube.

The second electrode or anode 16, a cylindrical sleeve, is disposed radially inward from the plasma source tube 20. A positive voltage is applied to the anode 16 by means of a second DC power surce 32. The third electrode 18, a cylindrical sleeve also disposed radially inward from the plasma source tube 20, is axially spaced from the anode 16. The anode 16 and third electrode 18, each constructed of a high conductivity material such as copper, are electrically connected in parallel to the cathode 14.

Insulating collars 34 are provided in the source tube 20 for the passage of lead wires to the anode 16 and third electrode 18 circuit. Water cooling can be provided for the anode 16 and third electrode 18 if necessary. A magnetic coil 36 such as a short solenoid is concentrically arranged about the plasma source tube 20 to provide a magnetic field within the tube 20. The coil 36 is electrically connected to a third DC power source 38 such as a battery.

Connected to the output end of the plasma source 10 is a travelling magnetic wave plasma accelerator 12. The accelerator 12 comprises an accelerator tube having a number of spaced sets of magnetic coil turns 42 concentrically wrapped around it. The accelerator tube 40 can be an extension of the plasma source tube 20 or a separate tube connected to the plasma source tube 20. Each set of coil turns 42 is connected in electrical series with a switch 44 and a power source 46 such as a capacitor bank. If required, a field shaping magnetic coil 48 can be concentrically arranged about the accelerator tube 40 near the plasma source 10 to shape or extend the magnetic field produced by the plasma source magnetic coil 36. A fourth DC power source 50 is electrically connected to the shaping coil 48.

Discharge of the plasma from the source 10 is accomplished by initiating a gas flow through the gas tube 30, activating the magnetic coil 36 and establishing full supply voltage across the three electrodes 14, 16, and 18. The cathode 14 is heated to appropriate emission levels by the power source 28. Electrons from the cathode 14 oscillate in the region of the three electrodes 14, 16, 18 and ionize gas in this area. The anode 16 establishes a positive area of plasma through which the electrons oscillate. The third electrode 18 helps to localize the discharge by creating a region near cathode potential which repels electrons but permits the plasma to diffuse through. In this manner, a sustained discharge of plasma occurs. Typically, an argon input of 0.7 atm.-cc./sec. with a magnetic field of 3000 gauss and a 300 v. supply voltage can be utilized.

Cooling water is circulated to maintain the anode 16 and third electrode 18 at a reasonable temperature. The field shaping coil 48 can be activated to shape and extend the static magnetic field at the exit of the plasma source 10.

A magnetic flux is established within the plasma as it is created in the source 10 and as the plasma is discharged into the accelerator 12. It is at this point that travelling magnetic field wave is initiated in the accelerator 12. This can be accomplished by successively discharging each capacitor 46 through the coil 42 by closing the switch 44. This successive discharge produces a moving current step and magnetic field which travels down the accelerator transmission line at a velocity determined by the loading of the line. Alternately, each capacitor 46 may be initially uncharged and a current pulse from an external power source may be propagated down the line achieving the same result. In either case the travelling magnetic field will compress and push the plasma ahead to an extent determined by the strength and shape of the field and the conductivity and degree of ionization of the plasma. The flux established in the plasma during its creation is not linked to the accelerator magnetic coils and serves to reduce plasma fluidity, provide additional magnetic insulation from the walls of the accelerator, and results in extra plasma confinement and stability during acceleration. As a result, plasma slippage losses during acceleration are signficantly reduced if not completely eliminated.

Figure 2:
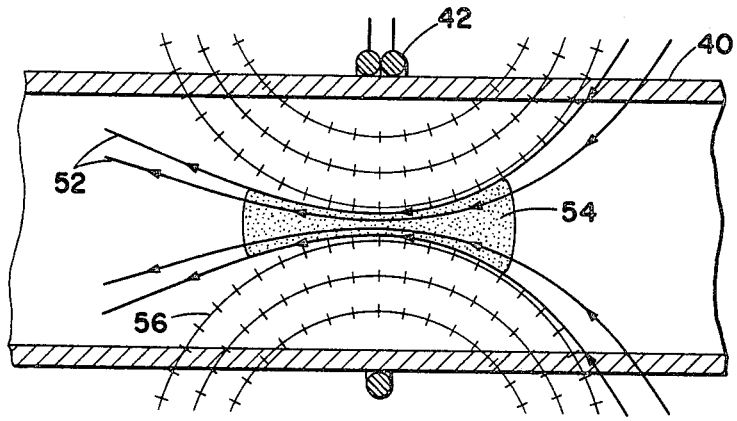
FIG. 2 is an enlarged fragmentary longitudinal sectional view of a portion of the accelerator of FIG. 1 illustrating the interaction of a travelling magnetic wave initiated in the accelerator and the plasma at a time $t_1$.
Figure 3:
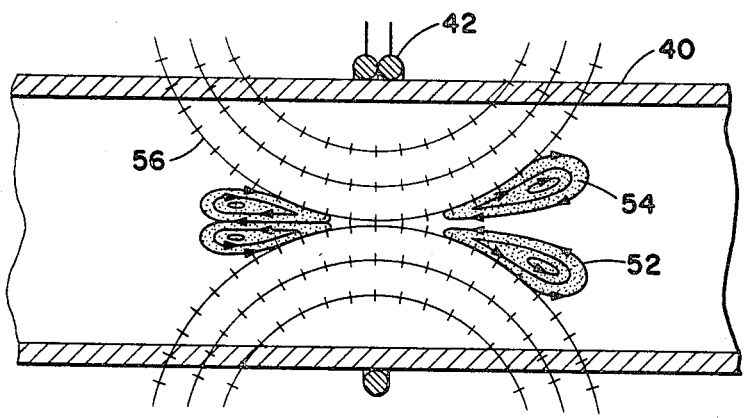
FIG. 3 is an enlarged fragmentary longitudinal sectional view of a portion of the accelerator of FIG. 1 illustrating the interaction of the travelling magnetic wave and the plasma at a later time $t_2$.
Figure 4:
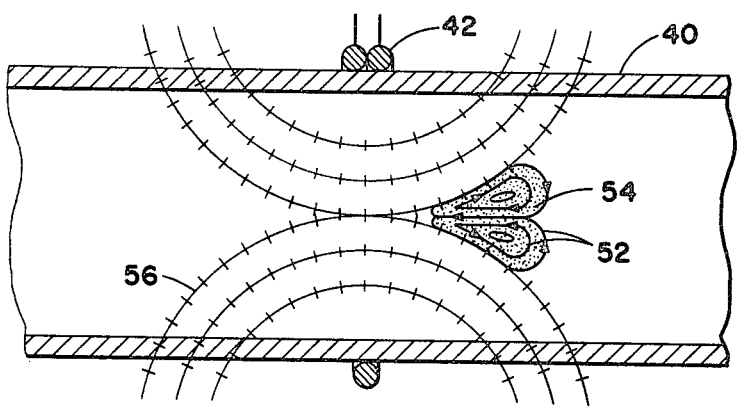
FIG. 4 is an enlarged fragmentary longitudinal sectional view of a portion of the accelerator of FIG. 1 illustrating the actual acceleration of the plasma at a still later time $t_3$.

FIGS. 2, 3, and 4 illustrate at various times the interaction between the travelling magnetic field and the plasma flux which results in the plasma acceleration. Referring to FIG. 2, this interaction is shown in time $t_1$, the instant immediately after initiation of the travelling magnetic wave. The static magnetic field lines 52 pass through and confine the plasma 54. The travelling magnetic field lines 56, (shown with cross bars to distinguish them from the static magnetic field lines 52) travelling from left to right in all of the FIGS. 2–4, simultaneously compress the plasma 54 and the static magnetic field 52 trapped within the plasma 54. The travelling magnetic field 56 is considerably stronger than the static magnetic field 52.

At time $t_2$, illustrated in FIG. 3, the travelling magnetic field 56 is shown overriding and reversing the static magnetic field 52 in the region external to the plasma 54. In the region of the crest of the travelling magnetic wave, the travelling magnetic field 56 has sufficient intensity to completely separate the plasma 54 into two distinct sections during the rise of this field. During this separation, the wave 56 will bend back the static field lines 52 emerging from the plasma 54, at the point of separation in opposition to the wave 56, to the same direction as the magnetic field lines of the travelling wave. At the same time the static field lines 52 emerging from the front of the advancing plasma 54 are also bent back to completely sever their magnetic linkage to the static field coil 36 and the field shaping coil 48. Thus the static magnetic field 52 is trapped within the plasma 54 since the field lines no longer link the DC coils which produced the static magnetic field 52. The static flux is then free to move with the plasma 54 and the travelling wave 56.

FIG. 4 illsutrates the acceleration of the plasma with the flux trapped therein at time $t_3$. Since the plasma 54 is highly conductive, the travelling wave 56 cannot diffuse into the plasma and will compress and drive the plasma 54 ahead of it. The flux trapped in the plasma 54 will continue to exist separate from the travelling field 56 because of the intervening plasma 54 which prevents the mixing of the two fields. Thus, by increasing cohesion of the plasma 54 and by interposing a magnetic field 52 between the plasma 54 and the leakage region, slippage losses are essentially eliminated. In addition, the trapped flux tends to relieve the problem of disengagement of the plasma 54 from the travelling magnetic field 56 at the exit of the acceleration. This is possible since the flux linking is tied to the plasma 54 itself and not to the accelerator transmission line.

While a specified embodiment of the invention has been illustrated and described, it is to be understood that this embodiment is by way of example only, and that the invention is not to be construed as being limited thereto, but only by the proper scope of the appended claims.

What is claimed is:

1. A plasma accelerator comprising
   an elongated tubular member defining an axially extending acceleration path therewithin,
   means for establishing a static magnetic field in a predetermined region in said tubular member,
   means for providing a plasma of electrically charged particles in said pretermined region in said tubular member so that magnetic flux from said static magnetic field is estiblished within the plasma as it is provided,
   a travelling magnetic wave generator comprising
   a plurality of magnetic field coils extending axially in surrounding relation to said tubular member, and
   means for sequentially energizing said plurality of magnetic field coils in succession to produce a magnetic field travelling along the acceleration path and accelerating the plasma therealong;
   the means for establishing the static magnetic field and the means for providing the plasma of charged particles being disposed at one end of said travelling magnetic wave generator, and
   the magnetic flux from said static magnetic field which is established in the plasma being independent of the travelling magnetic field and being trapped within the plasma by the travelling magnetic field so as to substantially eliminate slippage between the plasma and the traveling magnetic field.

2. A plasma accelerator as defined in claim 1, wherein said means for establishing the static magnetic field comprises
   a magnetic coil arranged about said tublar member in surrounding relation to the predetermined region therein in which the plasma is to be provided, and
   means for energizing said magnetic coil to establish the static magnetic field in the predetermined region in said tubular member where the plasma is to be provided; and
   the longitudinal extent of said magnetic coil being confined to the portion of said tubular member bounding the predetermined region therein so as to dispose said magnetic coil in axially spaced relation to the plurality of magnetic field coils of said travelling magnetic wave generator.

3. A plasma accelerator as defined in claim 2, further including
   a field shaping magnetic coil arranged about said tubular member so as to be interposed between said magnetic coil for establishing the static magnetic field and said magnetic field coils of said travelling magnetic wave generator, and
   means for energizing said field shaping magnetic coil so as to control the shape and extent of the static magnetic field established by the energization of said magnetic coil.

References Cited

UNITED STATES PATENTS 3,059,149  10/1962  Salisbury _____ 313—63 X

JAMES W. LAWRENCE, *Primary Examiner.*

C. R. CAMPBELL, *Assistant Examiner.*

U.S. Cl. X.R.

313—153, 154, 231; 315—111